W. H. HEARD.
SAFETY CLUTCH FOR POWER DRIVEN PUMPS.
APPLICATION FILED NOV. 10, 1910.
1,064,322.
Patented June 10, 1913.
2 SHEETS—SHEET 2.
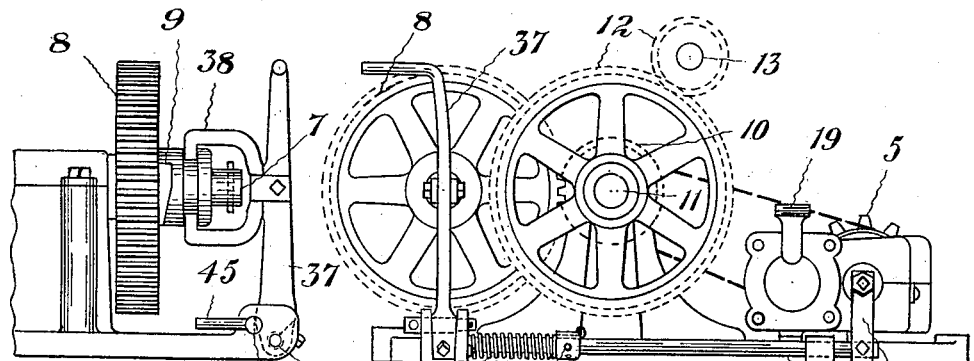
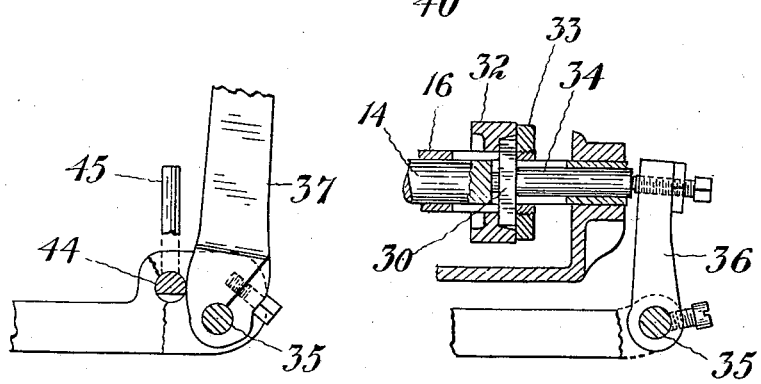
WITNESSES:
INVENTOR.

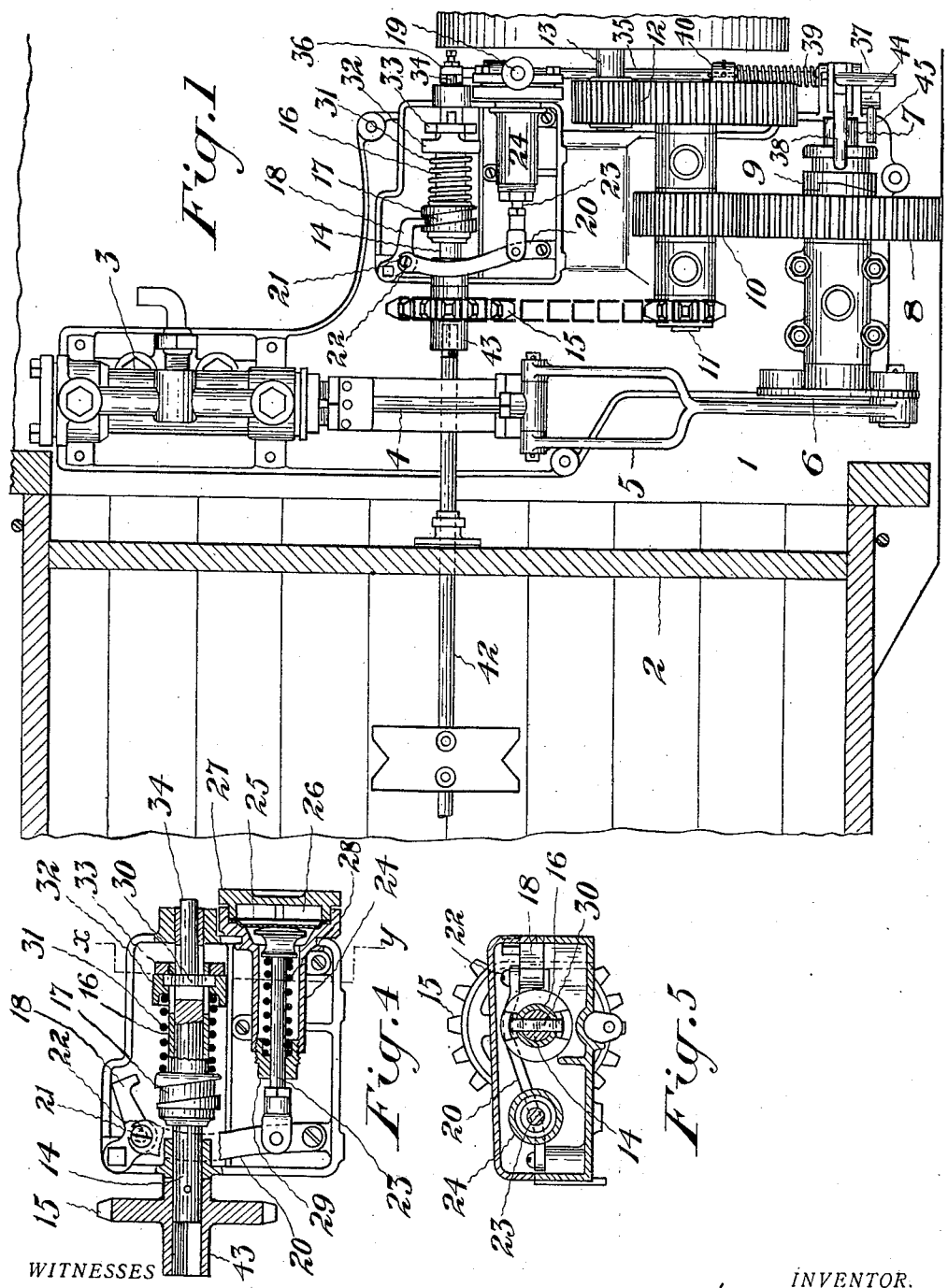

UNITED STATES PATENT OFFICE.

WILLIAM HENRY HEARD, OF LONDON, ONTARIO, CANADA.

SAFETY-CLUTCH FOR POWER-DRIVEN PUMPS.

1,064,322.  Specification of Letters Patent.  Patented June 10, 1913.

Application filed November 10, 1910. Serial No. 591,698.

*To all whom it may concern:*

Be it known that I, WILLIAM H. HEARD, of the city of London, in the Province of Ontario, Canada, have invented certain new and useful Improvements in Safety-Clutches for Power-Driven Pumps, of which the following is a specification.

This invention relates to improvements on the safety-clutch described and illustrated in my prior United States Patent No. 876,053 granted January 7, 1908.

In the prior construction the clutch was positively withdrawn from gear and it is my object to devise a construction whereby a spring may be put in tension when the fluid pressure is too great which spring is adapted to shift the clutch out of gear, and which shift will therefore generally take place when the pump is on dead center or at such other time as the clutch is transmitting little or no power.

It is also my object to improve the mechanism in various other ways substantially as hereinafter more specifically described and illustrated in the accompanying drawings in which:

Figure 1 is a plan view of part of a power spraying machine provided with my automatic regulator, parts being shown in section. Fig. 2 is a side elevation of part of the same. Fig. 3 is an end elevation of part of the same. Fig. 4 is a longitudinal horizontal section of the automatic regulator. Fig. 5 is a cross section on the line $x$—$Y$ in Fig. 4. Fig. 6 is a detail of the catch for holding the clutch out of gear. Fig. 7 is a sectional detail of part of the sleeve and shaft of the automatic regulator showing the method of actuating the clutch operating rock shaft.

In the drawings like figures of reference indicate corresponding parts in the different figures.

1 is part of the platform of the power spraying apparatus on which is supported the tank 2 shown in section in Fig. 1.

3 represents a pump which for the purpose of this invention may be of any suitable construction.

4 is the plunger rod of the pump, which by means of the connecting rod 5, is connected with the crank disk 6 of the crank shaft 7.

On the crank shaft is a loose gear wheel 8 which by means of the clutch 9 may be given a driving connection with the shaft. This gear wheel 8 meshes with the pinion 10 on the driving shaft 11. This driving or pump actuating shaft may itself be driven in any suitable manner. I show it as actuated by means of the gearing 12 from a shaft 13 which represents the crank shaft of an internal combustion motor. It is evident that by means of the clutch 9 the pump actuating shaft 11 may be caused to actuate the pump or allow it to remain idle.

14 is the shaft of the automatic regulator which is driven from the pump actuating shaft 11 by means of sprocket gearing 15. The regulator itself is similar in general principles to that described in the prior patent hereinbefore referred to, though differing in details of construction.

On the regulator shaft is a sleeve 16 on one end of which is formed the helical groove 17. Adjacent this groove is fulcrumed the shifter lever 18, the free end of which is adapted to engage in the helical groove 17. This lever is controlled as to its movements by the pressure in a fluid conduit 19 by the following mechanism; the lever 20 is fulcrumed at one end and at the other is provided with a slot or notch 21, engaging a pin 22 on the lever 20. Connected to the lever 20 adjacent its fulcrum is a plunger rod 23 slidable in a cylinder 24. The other end of this plunger rod is suitably shaped to engage a flexible diaphragm 25 set in the diaphragm chamber 26 and held in place by the removable cap 27. The conduit 19 communicates with this chamber as shown.

It will be understood that in practice the fluid conduit is connected with some part of the apparatus where it will be subject to the fluid pressure generated by the pump 3. A coil spring 28 engages a shoulder in the end of the cylinder and the head of the plunger rod 23 and tends to maintain the parts in the position shown in Fig. 4. As soon as the pressure in the diaphragm chamber is sufficient to overcome the tension of the coil spring the lever 20 will be rocked to cause the shifter lever 18 to engage the helical groove 17. It will be noted that the end 29 of the cylinder 24 is screwed into the cylinder. By screwing the end in or out the tension of the coil spring 28 may be varied and the device set to act at any predetermined pressure of the fluid conduit.

The sleeve 16 and the shaft 14 are each slotted and a cross pin 30 passes through the slots. One object of this cross pin is to prevent rotation of the sleeve while permitting it to move longitudinally on the shaft. It will be evident then that when the shifter lever is in engagement with the helical groove that by the rotation of the shaft the sleeve will be moved endwise until the shifter lever runs out at the end of the groove. This endwise movement of the sleeve is utilized to shift the clutch through the medium of the following mechanism: A coil spring 31 is placed on the sleeve 16 engaging a shoulder thereon and also engaging the cross pin 30. The engagement with the cross pin 30 is preferably through the medium of a movable collar 32 which has notches in its end to fit over the ends of the cross pin 30. The pin is thus securely held in place. A fixed collar 33 is preferably screwed on the end of the sleeve and forms a stop limiting the movement of the cross pin under the action of the spring. Being screwed in place it may be adjusted to vary the tension of the spring 31. The end of the regulator shaft 14 is hollow, as shown, and within is set the sliding pin 34 preferably of hardened steel. By the endwise movement of the sleeve 16 this pin is projected from the end of the regulator shaft and actuates the parts immediately concerned in the shifting of the clutch.

In the construction shown I employ a rock shaft 35 provided with a rock arm 36 adapted to be engaged by the pin 34 and with a rock arm 37 to which is connected an ordinary forked clutch shifter 38 engaging the clutch 9 in the usual manner. On the rock shaft is placed a coiled torsion spring 39 one end of which engages a stationary part while the other is connected with a collar 40 which may be rotated to adjust the tension of the spring and held as adjusted by means of a pin 41. This torsion spring normally tends to throw the clutch in gear. Its tension may, however, be overcome by the tension of the coil spring 31 when the sleeve 16 is shifted, as hereinbefore described, and the clutch thrown out of gear.

The main object in having the sliding pin 34 actuated through the medium of the coil spring 31 is that considerable power is required to pull the clutch out of gear when the full driving strain of the motor is being transmitted thereby. If the sliding pin were positively actuated considerable loss of power and wear and tear results. With the arrangement described, however, the coil spring 31 is compressed by the sliding of the sleeve, but its tension is not sufficient to overcome the tension of the spring 39 until the pump is on a dead center or the strain of driving otherwise relieved. At such times the coil spring will expand, force out the sliding pin 34 and cause the withdrawal of the clutch.

The driving shaft and regulator shaft no longer being one and the same as in my prior construction I am enabled to use the regulator shaft 14 to drive the agitator shaft 42. This is simply arranged by forming the hub 43 at the end of the regulator shaft with a square recess adapted to receive the square end of the agitator shaft.

As it is sometimes desirable to be able to hold the clutch out of gear independent of the automatic regulator I journal in a suitable bearing adjacent to the lower end of the rock arm 37 a small cam shaft 44. A cam is formed on this shaft by cutting away a portion of the shaft, so that when the cam shaft 44 is in the position shown in Fig. 3 the arm 37 may rock freely to put the clutch in gear. By turning the cam shaft, however, the rock arm may be forced back or held back with the clutch out of gear. A small arm 45 is secured to the end of this cam shaft by means of which it may be actuated.

What I claim as my invention is:—

1. In a device of the class described the combination of a driving member; a driven member; a clutch whereby they may be put into and out of gear with one another; a slidable sleeve rotatable with the driving member and having a helical groove formed therein; a spring adapted to be tensioned by said sleeve to move the clutch out of gear; a shifter movably supported adjacent to the sleeve and adapted to engage the groove therein; and means for moving the shifter into engagement with the said groove.

2. In a device of the class described the combination of a driving member; a driven member; a clutch whereby they may be put into or out of gear with one another; a rock shaft; a rock arm on said shaft adapted to actuate the clutch; a second rock arm on said shaft; means normally inoperative, operable by said driving member to rock said second rock arm; and means for putting the rock arm actuating means in operable condition.

3. In a device of the class described the combination of a driving member; a driven member; a clutch whereby they may be put into or out of gear with one another; a rock shaft; a rock arm on said shaft adapted to actuate the clutch; a second rock arm on said shaft; means normally inoperative, operable by said driving member to rock said second rock arm; means for putting the rock arm actuating means in operable condition; a coil torsion spring tending to rock the rock shaft to put the clutch into gear; and means for adjusting the tension of said spring.

4. In a device of the class described the combination of a driving member; a driven member; a clutch whereby they may be put into or out of gear with one another; a rock shaft, a rock arm on said shaft adapted to actuate the clutch; a second rock arm on said shaft; means normally inoperative, operable by said driving member to rock said second rock arm; means for putting the rock arm actuating means in operable condition; a coil torsion spring tending to rock the rock shaft to put the clutch in gear; means for adjusting the tension of said spring; and a manually operable catch adapted to releasably hold said rock shaft in the position in which it holds the clutch out of gear.

5. In a device of the class described the combination of a hollow regulator shaft slotted near one end for the passage of a cross pin; a sliding sleeve rotatable with the regulator shaft and having a shoulder formed thereon and slotted at the end remote from the said shoulder; means whereby the rotation of the shaft may be utilized to shift the sleeve along the shaft; a cross pin passing through the slots in the sleeve and shaft; a coil spring bearing against the said pin and the shoulder on the sleeve; a stop on the sleeve limiting the movement of the pin under the influence of the spring; and a part adapted to enter the hollow end of the shaft and engage the pin so that it may be moved thereby.

6. In a device of the class described the combination of a hollow regulator shaft slotted near one end for the passage of a cross pin; a sliding sleeve rotatable with the regulator shaft and having a shoulder formed thereon and slotted at the end remote from the said shoulder; means whereby the rotation of the shaft may be utilized to shift the sleeve along the shaft; a cross pin passing through the slots in the sleeve and shaft; a sliding collar on the sleeve notched in its ends to receive the ends of the cross pin; a coil spring bearing against said collar and the shoulder on the sleeve; a stop on the sleeve limiting the movement of the pin under the influence of the spring; and a part adapted to enter the hollow end of the shaft and engage the pin so that it may be moved thereby.

Dated at Toronto this seventh day of November 1910.

WILLIAM HENRY HEARD.

In the presence of—
J. W. G. WINNETT,
R. E. WATKER.

---

Copies of this patent may be obtained for five cents each, by addressing the "Commissioner of Patents, Washington, D. C."